United States Patent
Bobbitt et al.

(10) Patent No.: US 7,035,955 B2
(45) Date of Patent: Apr. 25, 2006

(54) BLADE SERVER ADAPTER CARD

(75) Inventors: Jil M. Bobbitt, Austin, TX (US); Zhan Mei, Round Rock, TX (US); Dung T. Nguyen, Round Rock, TX (US); Scott M. Ramsey, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 10/407,013

(22) Filed: Apr. 3, 2003

(65) Prior Publication Data
US 2004/0199699 A1   Oct. 7, 2004

(51) Int. Cl.
G06F 13/14  (2006.01)
G06F 13/00  (2006.01)

(52) U.S. Cl. ...................... 710/305; 710/300
(58) Field of Classification Search ................. 710/305
See application file for complete search history.

(56) References Cited

U.S. PATENT DOCUMENTS

| | | | |
|---|---|---|---|
| 5,499,377 A | 3/1996 | Lee | 395/200.01 |
| 5,651,129 A | 7/1997 | Yokote et al. | 395/431 |
| 5,937,176 A | 8/1999 | Beasley et al. | 395/311 |
| 6,256,014 B1 | 7/2001 | Thomas et al. | 345/163 |
| 6,378,014 B1 | 4/2002 | Shirley | 710/100 |
| 6,388,658 B1 | 5/2002 | Ahern et al. | 345/168 |
| 6,557,170 B1 * | 4/2003 | Wilder et al. | 725/130 |
| 2002/0124114 A1 * | 9/2002 | Bottom et al. | 709/251 |
| 2002/0143996 A1 * | 10/2002 | Odryna et al. | 709/246 |
| 2004/0098532 A1 * | 5/2004 | Huang et al. | 710/316 |

OTHER PUBLICATIONS http://catalog.belkin.com/IWCatProductPage.process?Merchant_Id=1&Product_Id=122845, Nov. 21, 2002.
http://images.belkin.com/FIDA116T/FUL1_F1DA116T.jpg, Nov. 21, 2002.
http://www.avocent.com/web/en.nsf/Content/AutoView+&+Outlook, Nov. 21, 2002.
http://www.dell.com/us/en/bsd/products/model_svrac_1_svrac_console.htm, Nov. 21, 2002.
http://www.raritan.com/products.asp, Nov. 21, 2002.

* cited by examiner

Primary Examiner—Rehana Perveen
Assistant Examiner—Jeremy S. Cerullo
(74) Attorney, Agent, or Firm—Baker Botts L.L.P.

(57) ABSTRACT

A modular information handling system includes a KVM management card. The KVM management card manages KVM communication with associated blade servers and allows access to KVM signals from each of the associated blade server through a VGA connector, a first PS2 connector and a second PS2 connector.

8 Claims, 2 Drawing Sheets

BLADE SERVER ADAPTER CARD

TECHNICAL FIELD

This disclosure relates in general to the field of computer systems and more specifically to adapter cards for blade server applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a so called modular information handling system which may also be referred to as a modular server, blade server or brick server. Typically, blade servers utilize a midplane to allow multiple modular server cards or "blades" to be associated within a single computer chassis. The multiple blades are then interconnected via the midplane and typical share a common power supply and other resources such as network interface cards and management cards. Each blade typically includes an independent processor and memory.

One problem associated with the use of modular servers is that each blade produces its own independent keyboard video and mouse signal (KVM). However, the blade itself does not allow a user to access the necessary ports to communicate KVM signals as it plugs directly into a midplane within the chassis and does not have KVM connectors. Existing systems utilize multiple KVM ports associated with the midplane to communicate the KVM signals of each blade.

Another problem is that a keyboard video and mouse (KVM) port, Network Interface Card (NIC), COM port and power must be connected through a midplane. Presently there is no functionality for these four sub systems unless a midplane is present. Accordingly, a user desiring to operate or test a single blade will be required to utilize a system board such as a midplane to access the functionality of the blade.

SUMMARY

Therefore a need has arisen for a system and method for easily accessing KVM signals from multiple blades within a modular server system.

A need has also arisen for a system and method for allowing a single blade server to connect with a keyboard video mouse (KVM) port network interface cards (NICs), COM port and a power supply without requiring a connection through a midplane.

In accordance with teachings of the present disclosure systems method are described for a modular information handling system component with a blade server KVM management card that allows for the communication and management of communication with the KVM signals of multiple associated blade servers. Additionally, a stand alone blade server adapter card is disclosed that allows for a stand alone blade server to have access to a COM port, a NIC, a KVM interface, and a power supply without the use of or requirement of a midplane.

In one aspect, a modular information handling system component is disclosed that includes a blade server KVM management card. The KVM management card is able to connect with a midplane of a modular information handling system and is able to manage communications with a plurality of associated blade servers. The KVM management card includes a midplane connector for connecting with a midplane and a KVM switching controller. The KVM switching controller is able to manage KVM communication with multiple associated blade servers and also provides connection to a VGA converter, a first PS2 connector and a second PS2 connector. In another aspect a stand-alone blade server adapter card is disclosed that includes a blade connector able to couple to a blade server. The adapter card also includes a serial port, a first NIC, a second NIC, a KVM interface, and a power supply, a reset circuit.

The present disclosure provides a number of important technical advantages. One technical advantage is providing a blade server KVM management card that is able to communicate with multiple blade servers within a modular information handling system. This allows for a user to conveniently access the KVM signals of multiple blade server components within a modular information handling system through a single interface. Another technical advantage is providing an adapter card for communicating with a single or stand alone blade server. The adapter card advantageously allows for power, KVM and communication signals to be provided to a blade server component without requiring the use of a midplane. This allows for individual blade servers to be used as stand alone system or for testing purposes.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
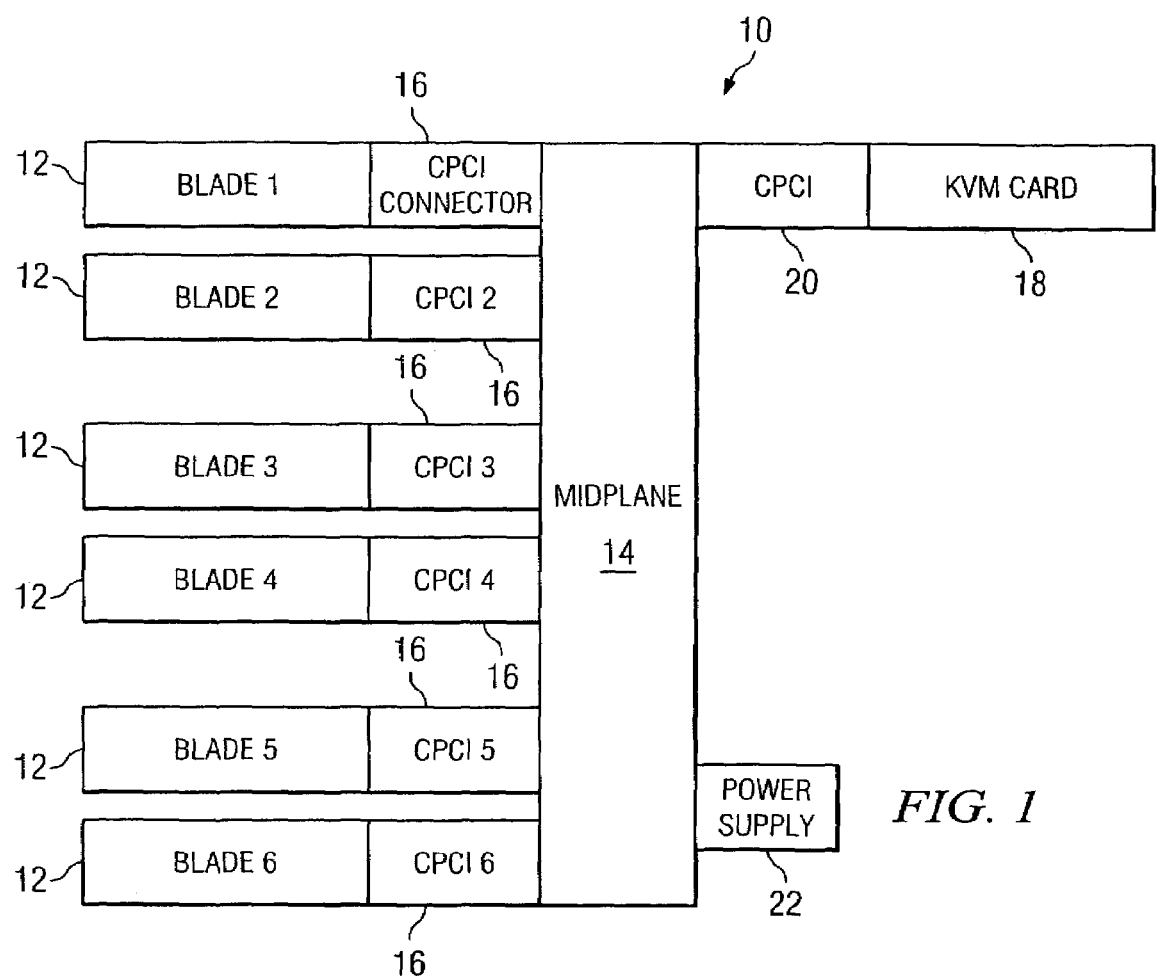
FIG. 1 shows a modular information handling system including a KVM card according to teachings of the present disclosure.
Figure 2:
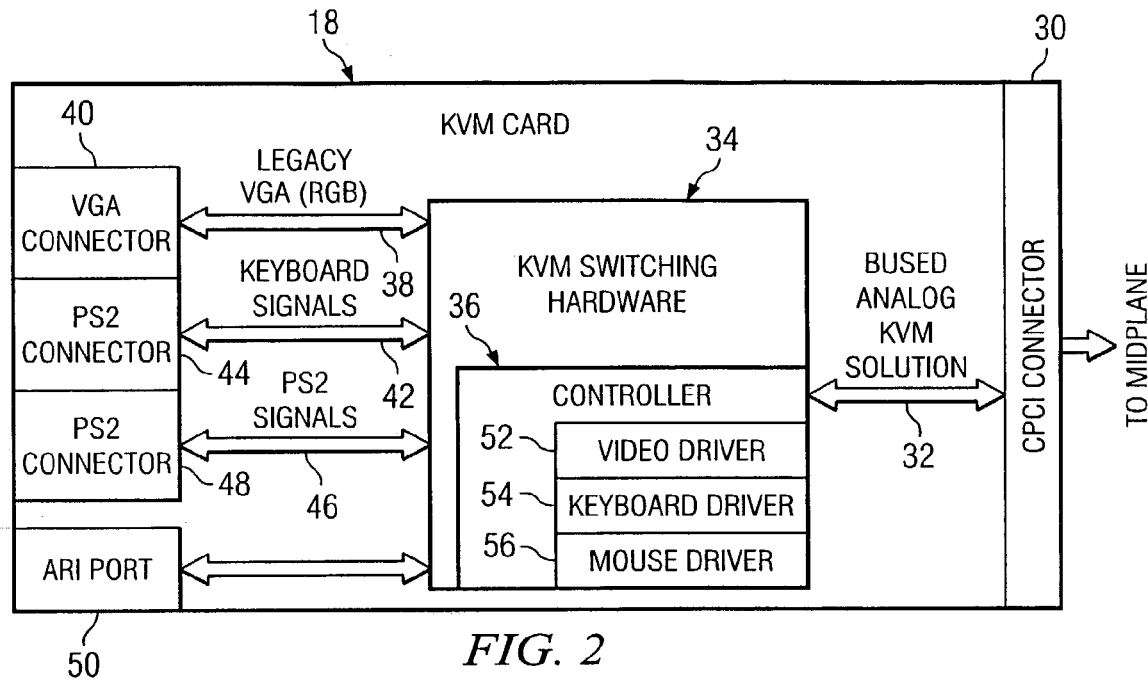
FIG. 2 shows a block diagram of a KVM card for use with blade servers or modular information handling systems according to teachings of the present disclosure.
Figure 3:
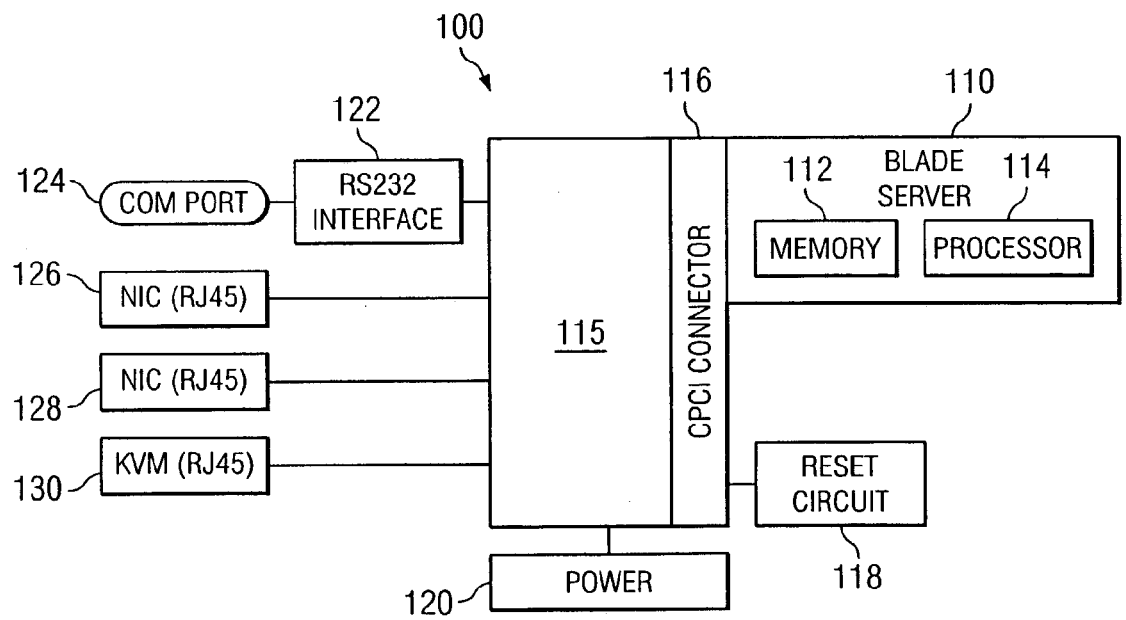
FIG. 3 shows an adapter card for providing comport, NIC, KVM, and power access to a stand alone blade.

Preferred embodiments and their advantages are best understood by reference to FIGS. 1 through 3, wherein like numbers are used to indicate like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modular information handling systems are one type of information handling system. Modular information handling systems, sometimes referred to as "blade servers" or "back servers" typically include multiple motherboards are interconnected to a common midplane and housed in a single chassis. For example, the Dell PowerEdge 1655MC blade server manufactured by the Dell Computer Corporation® houses up to six blades in the 3U form factor. Each blade within the PowerEdge 1655MC is equipped with up to two 1.26 $GH_z$ Intel® Pentium® III processors with a 133 MHz front side bus and 512 kB full speed cache. Additionally, each blade is equipped with two SCSI hard disk drives with an integrated hardware based Ultra 320 SCSI Raid Controller. Generally, modular information handling systems allow for increased manageability and data center efficiency because processing density is increased and because blades are able to share resources such as power supply.

Now referring to FIG. 1, a diagram of a modular information handling system, depicted generally at 10, is shown. Modular information handling system 10 includes a midplane 14 with multiple blades 12 and a KVM management card 18. In the present embodiment, six blades 12 are connected with midplane 14 via CPCI connectors 16. Each blade 12 includes a mating connector for connecting with CFCI connectors 16 (not expressly shown). In alternate embodiments, midplane 14 may be able to connect to more or fewer blades 12. Additionally, the present embodiment shows that each CPCI connector 16 has a blade 12 attached thereto. In preferred embodiments information handling system 10 will operate if one or more blades are disconnected from midplane 14 and also may "hotswap" blades during operation. In other alternate embodiments, midplane 14 and blades 12 may interconnect using any suitable connector, such as a HDM connector. Each blade 12 includes a mating connector (not expressly shown) for connecting with connector 16. Each blade 12 typically includes a processor and memory (not expressly shown).

KVM management card 18 is also connected to midplane 14 via CPCI connector 20. A power supply 22 is connected with midplane 14 and is sized to provide power to blades 12. Alternate systems may also include a redundant power supply, a network interface card, a management card (not expressly shown) and other resources that may be shared by associated blades 12.

Now referring to FIG. 2, a block diagram of a KVM management card, depicted generally at 18, according to teachings of the present disclosure is shown. KVM management card includes KVM switching hardware 34, including controller 36, connected with a midplane connector 30 for connecting with a midplane (such as midplane 14 shown in FIG. 1.) In the present embodiment connector 30 is a CPCI connector. KVM switching hardware 34 is preferably connected with CPCI connector 30 via a bused analog KVM solution 32.

KVM switching hardware 34 is further in connective communication with VGA connector 40, first PS2 port 44, second PS2 port 48, and Analog Rack Interconnect (ARI) port 50. VGA connector 40 is connected to KVM switching hardware and communicates legacy VGA (RGB) signals 30 therefrom. VGA connector 40 preferably enables for the VGA signals from the associated blades to be accessed.

In the present embodiment, first PS2 connector 44 communicates keyboard signals 42 with switching hardware 34 and second PS2 connector 48 communicates other PS2 signals such as mouse signals with switching hardware 34, and further to associated blades 12. The present embodiment also includes ARI port, however, the present disclosure contemplates alternate embodiments that do not include an ARI port 50.

KVM switching hardware 34 preferably operates to communicate KVM signals with VGA connector 40, first PS2 connector, and second PS2 connector 48 and also to manage KVM communication with blades 12 associated with midplane 14. In the present embodiment, controller 35 manages communication with associated blades 12. Controller 36 preferably includes a video driver 42, a keyboard driver 54, and a mouse driver 56. Each driver 52, 54, 56 operates to communicate appropriate signals to selected blades 12 to enable or disable the communication of video, keyboard, or mouse signals with the selected blade. In this manner, a user connected to VGA connector 40, and PS2 Connectors 44 and 48 may have keyboard, video, and mouse communication with any of the associated blades.

Each blade 12 associated with midplane 14 preferably includes an integrated blade KVM controller (not expressly show) that acts to enable or disable KVM communication. KVM switching hardware 34 communicates with each of the blade KVM controllers using a suitable communication protocol to enable or disable the KVM communication with selected blades 12.

KVM switching hardware 34 preferably includes a blade selection application operable to allow users to select which blade 12 to communicate with. The blade selection application preferably provides a graphic user interface that graphically displays each blade 12 associated with midplane 14. The user may then select the desired blade 12. KVM switching hardware 34 and controller 36 then act to establish KVM communication with the selected blade 12, as described above.

Now referring to FIG. 3, an adapter system, depicted generally at 100, for utilizing a stand alone blade without a midplane is shown. Adapter system 100 includes an adapter card 115 with a blade connector 116 incorporated therewith. Blade connector 116 is preferably a CPCI connector operable to interface directly with blade 110. In the present embodiment Blade 110 preferably includes memory 112 and processor 114. Adapter card 115 further includes a serial port or COM port 124 communicatively coupled thereto via an RS232 interface. COM port 124 may also be referred to as a serial port. Additionally, a first NIC 126 and a second NIC 126 are also communicatively coupled with adapter card 115. First NIC 126 card and second NIC 128 allow a blade server associated with adapter card to communicate with other information handling system via a network. First NIC 126 and second NIC 128 are preferably R-45 type ports.

KVM port is also in operative communication with adapter card 115. KVM port 130 is preferably an R-45 type port operable to allow for keyboard, video, and mouse communication. In alternate embodiments, KVM port 130 may be any port suitable for communicating keyboard, video and mouse signals.

Adapter card 115 further includes a power supply 120 and reset circuit 118 associated therewith. Power supply 120 may be connected with adapter card 115 through a suitable connector and power supply 120 is preferably sized to provide sufficient power to an associated blade 110. In the present embodiment, power supply 120 may preferably be a 12V, 5V, or 3V power supply. Reset circuit 118 allows a user to reset power to associated blade 110.

In operation, blade 110 is connected with CPCI connector 30. Adapter system 100 provides power to blade 110 through power supply 120. A user may then verify the NIC, COM port, and KVM functionality of blade 110 via NIC ports 126 and 128, COM port 124, and KVM port 130, respectively. Operation of adapter system 100 allows a user to determine the blade functionality described above without providing a midplane.

Although the disclosed embodiments have been described in detail, it should be understood that various changes, substitutions and alterations can be made to the embodiments without departing from their spirit and scope.

What is claimed is:

1. A stand alone blade server adapter system for communicating with a blade server without requiring a connection through a midplane comprising:
    a blade connector operable to couple directly with a blade server;
    a serial port connected to the connector;
    a first NIC connected to the connector;
    a second NIC connected to the connector;
    a KVM interface connected with the connector;
    a power supply connected with the connector operable to provide power to a blade server; and
    a reset circuit associated with the connector.

2. The adapter system of claim 1 wherein the connector further comprises a CPCI connector.

3. The adapter system of claim 1 further comprising the adapter system operable to facilitate a stand alone test of the associated blade server.

4. The adapter system of claim 1 further comprising the adapter system operable to facilitate the operation of the associated blade server.

5. The adapter system of claim 1 wherein the KVM port comprises an RJ45 port.

6. The adapter system of claim 1 wherein the first NIC, the second NIC, and the KVM interface each comprise an RJ45-type port.

7. The adapter system of claim 1 further comprising the power supply selected from the group consisting of: a 12 volt power supply, a 5 volt power supply, and a 3 volt power supply.

8. The adapter system of claim 1 operable to facilitate stand alone testing of the network interface card functionality of the associated blade server.

* * * * *